US009641830B2

(12) United States Patent
Mallet et al.

(10) Patent No.: US 9,641,830 B2
(45) Date of Patent: *May 2, 2017

(54) AUTOMATED CAMERA CALIBRATION METHODS AND SYSTEMS

(71) Applicant: LUCASFILM ENTERTAINMENT COMPANY, LTD., San Francisco, CA (US)

(72) Inventors: Ronald Mallet, Mill Valley, CA (US); Jason Snell, Nicasio, CA (US); Jeff Saltzman, San Francisco, CA (US); Douglas Moore, San Francisco, CA (US); Paige Warner, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 440 days.

This patent is subject to a terminal disclaimer.

(21) Appl. No.: 14/248,124

(22) Filed: Apr. 8, 2014

(65) Prior Publication Data

US 2015/0288951 A1    Oct. 8, 2015

(51) Int. Cl.
  *H04N 13/02*    (2006.01)
  *H04N 17/00*    (2006.01)
  *G06T 7/80*    (2017.01)
  *H04N 5/222*    (2006.01)

(52) U.S. Cl.
  CPC .............. *H04N 17/002* (2013.01); *G06T 7/80* (2017.01); *G06T 2207/30204* (2013.01); *H04N 5/2224* (2013.01)

(58) Field of Classification Search
  CPC .................................................... H04N 17/002
  USPC ............................................................ 348/46
  See application file for complete search history.

(56) References Cited

U.S. PATENT DOCUMENTS

| 4,241,349 | A  | 12/1980 | Connell       |
|-----------|----|---------|---------------|
| D314,736  | S  | 2/1991  | Ring et al.   |
| 6,377,300 | B1 | 4/2002  | Morris et al. |
| 7,071,966 | B2 | 7/2006  | Lu et al.     |
| 7,152,984 | B1 | 12/2006 | Hayes         |
| 7,339,159 | B2 | 3/2008  | Juh et al.    |
| 7,679,046 | B1 | 3/2010  | Benson et al. |

(Continued)

FOREIGN PATENT DOCUMENTS

EP    1 483 556 B1    12/2006

OTHER PUBLICATIONS

Non Final Office Action, dated Oct. 28, 2015, for U.S. Appl. No. 14/502,647, filed Sep. 30, 2014, 11 pages.

(Continued)

*Primary Examiner* — Farzana Hossain
(74) *Attorney, Agent, or Firm* — Kilpatrick Townsend & Stockton LLP

(57) ABSTRACT

Methods and systems are disclosed for calibrating a camera using a calibration target apparatus that contains at least one fiducial marking on a planar surface. The set of all planar markings on the apparatus are distinguishable. Parameters of the camera are inferred from at least one image of the calibration target apparatus. In some embodiments, pixel coordinates of identified fiducial markings in an image are used with geometric knowledge of the apparatus to calculate camera parameters.

19 Claims, 10 Drawing Sheets

(56) References Cited

U.S. PATENT DOCUMENTS

| | | | |
|---|---|---|---|
| 8,294,958 B2* | 10/2012 | Paterson | G01B 11/2518 358/1.9 |
| D704,900 S | 5/2014 | Childs et al. | |
| 8,937,682 B2 | 1/2015 | Hjelmstrom | |
| 9,307,231 B2* | 4/2016 | Mallet | H04N 17/002 |
| 2004/0080447 A1* | 4/2004 | Bas | H01Q 15/141 342/5 |
| 2004/0179098 A1 | 9/2004 | Haehn et al. | |
| 2005/0225640 A1 | 10/2005 | Sadano | |
| 2005/0280709 A1 | 12/2005 | Katayama | |
| 2008/0292131 A1* | 11/2008 | Takemoto | G06T 7/0018 382/100 |
| 2010/0017178 A1* | 1/2010 | Tsuk | G01B 11/24 703/6 |
| 2010/0053639 A1* | 3/2010 | Maier | G02B 5/124 356/620 |
| 2010/0259624 A1 | 10/2010 | Li et al. | |
| 2011/0299070 A1 | 12/2011 | Christiansen et al. | |
| 2013/0016223 A1 | 1/2013 | Kim et al. | |
| 2013/0063558 A1 | 3/2013 | Phipps | |
| 2013/0317352 A1* | 11/2013 | Case | A61B 34/20 600/424 |
| 2013/0327932 A1 | 12/2013 | Kim et al. | |
| 2015/0288956 A1 | 10/2015 | Mallet et al. | |

OTHER PUBLICATIONS

U.S. Appl. No. 14/248,141, "Notice of Allowance", Nov. 27, 2015, 5 pages.
U.S. Appl. No. 14/502,647, "Notice of Allowance", Dec. 7, 2015, 5 pages.
U.S. Appl. No. 29/503,920, "Notice of Allowance", Nov. 10, 2015, 48 pages.
Office Action dated Aug. 21, 2015 in U.S. Appl. No. 29/503,920, 10 pages.
U.S. Appl. No. 14/502,647 filed by Paige Warner on Sep. 30, 2014.
U.S. Appl. No. 29/503,920 filed by Paige Warner on Sep. 30, 2014.
Non-Final Office Action, dated Sep. 2, 2015, for U.S. Appl. No. 14/248,141, filed Apr. 8, 2015, 9 pages.

* cited by examiner

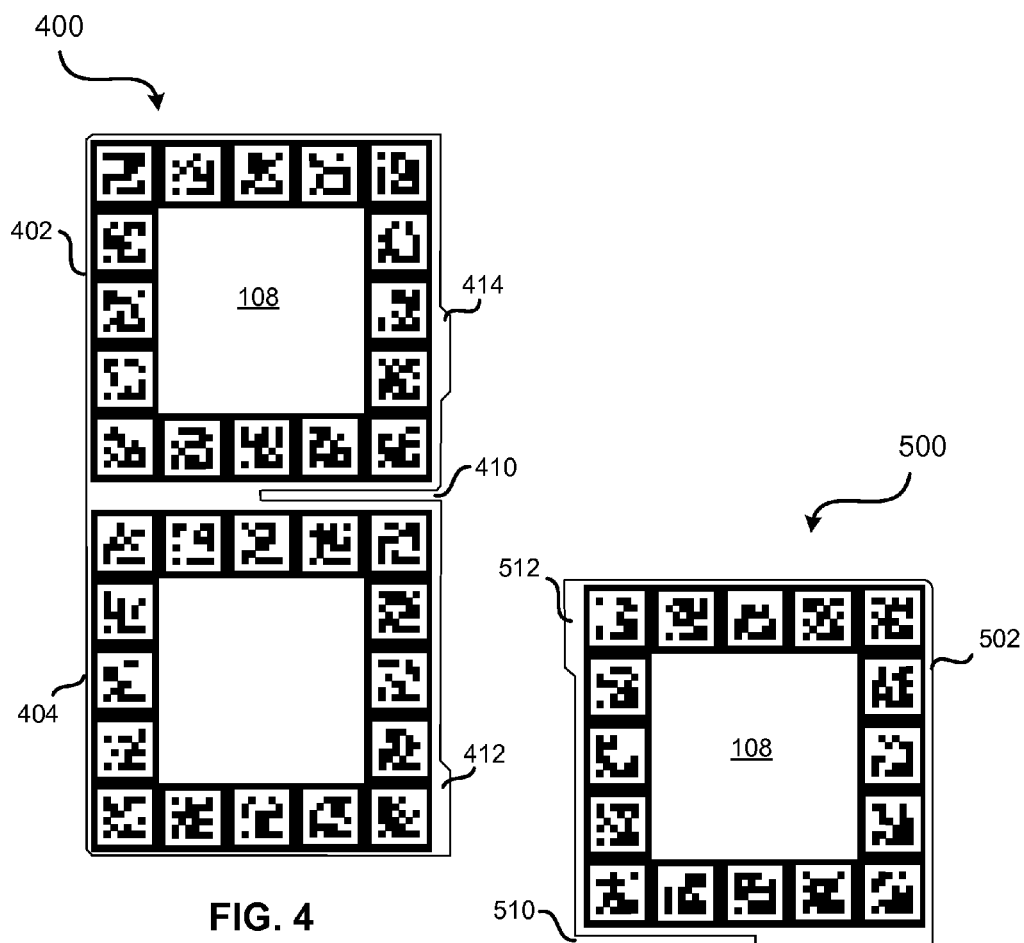

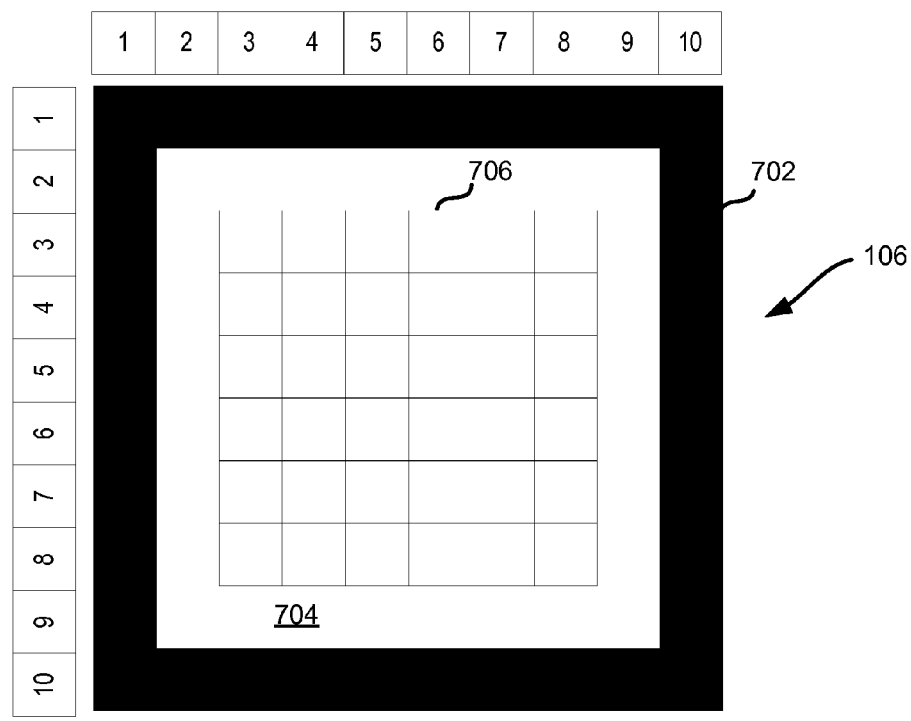
FIG. 7A
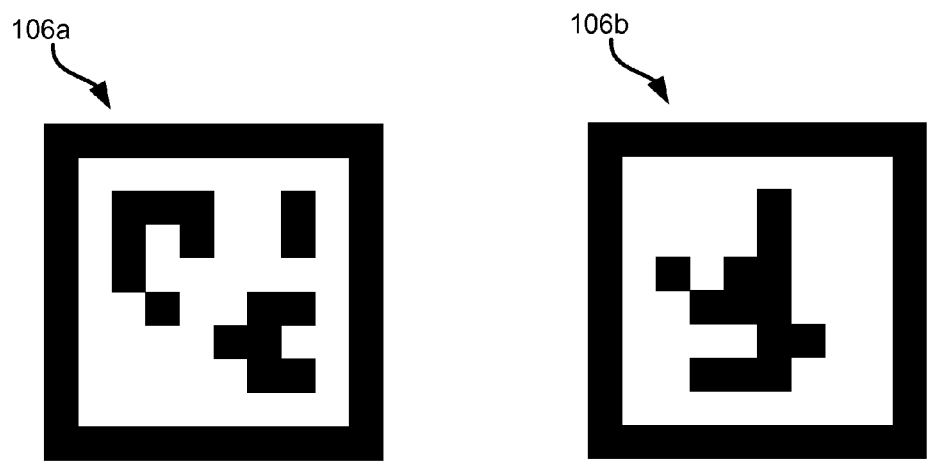
FIG. 7B  FIG. 7C

AUTOMATED CAMERA CALIBRATION METHODS AND SYSTEMS

CROSS-REFERENCES TO RELATED APPLICATIONS

This application is related to concurrently filed patent application U.S. patent application Ser. No. 14/248,141 entitled "CALIBRATION TARGET FOR VIDEO PROCESSING," which is incorporated by reference herein in its entirety.

BACKGROUND OF THE INVENTION

A camera creates a record of a three-dimensional (3D) physical scene with a two-dimensional (2D) image. The image may be recorded on a film or as a digital 2D array of pixel values. Computer-based animation techniques often involve capturing a series of images of an actor (or other object) with one or more cameras, which may have different viewing perspectives. The images from these cameras can be combined to generate a three-dimensional (3D) graphical representation of the actor that can be applied to an animated character and placed in a computer-generated 3D scene.

In order for the 3D representation and location of the character in the 3D scene to be accurate, the location of the camera must be able to be accurately reproduced. Towards this end, each camera needs to be calibrated to the 3D graphical representation of the scene. Calibration of a camera to the scene includes determining the intrinsic parameters of the camera and the location of the camera within the scene. Current systems for imaging calibration are relatively slow and inaccurate. Typically an image of a known object (referred to as a calibration target, calibration apparatus, or just a target or apparatus) is captured and an animator manually maps the object's features to the corresponding computer graphics model to set the orientation of a virtual camera in the 3D model. Currently known calibration targets may include a known pattern, image or markings formed on one or more surfaces or edges of the target, such as a black and white checkerboad pattern on one or more surfaces of the target or edges that are painted different colors. Once a camera's parameters have been determined by a calibration operation, a calibration target may also serve as a reference for configuring a virtual camera in the 3D representation of the scene in order, in some examples, to create further images of the scene.

Calibrating a camera to a virtual scene, or configuring a virtual camera, using such test objects often requires the animator to manually perform multiple tasks, such as marking corners (or the virtual corners in a computer-displayed image of the object) or performing an initial approximate alignment of the camera to a virtual computer model. Such a manual process is both intrinsicly time consuming and prone to potential in accuracies. In addition, current available calibration systems are unable to concurrently capture camera position, rotation, distortion, and focal length. Knowing properties such as these can be useful in generating animations based on the original physical scene.

BRIEF SUMMARY OF THE INVENTION

Embodiments of the invention pertain to a calibration target with a series of unique fiducial markings on each of multiple surfaces that enable methods and systems to automatically identify the precise position of the target in a scene without manual input from a user. Other embodiments of the invention pertain to systems and methods for automatically calibrating a camera, and for configuring a corresponding virtual camera.

One embodiment of a calibration target according to the invention includes a plurality of trihedral sections arranged around a central axis. Each trihedral section has first, second and third surfaces with a window formed through the surfaces, and each surface also has at least one unique fiducial marker arranged on it. In some embodiments each window has a plurality of unique fiducial markers arranged around a perimeter of the window. The fiducial markings can each be unique such that, for any given image of the target captured by a camera, there is only one position, rotation, distortion value, and focal length for the camera of interest.

In another embodiment, a calibration target according to the invention includes first, second and third planar plates that intersect mutually perpendicularly at a common point, such that an angle between any two adjacent plates is 90 degrees. Each of the first, second and third plates has opposing first and second surfaces that are divided by the intersection of the plates into four faces on the first surface and four faces on the second surface for a total of twenty four faces, and a plurality of unique fiducial markers formed on multiple ones of the twenty four faces. In some embodiments, each of the twenty four faces includes a window formed therein and a plurality of unique fiducial markers can be arranged around a perimeter of each window.

Fiducial markers according to some embodiments of the invention include a grid of cells with each cell in the grid representing a binary value. The grid of cells can be surrounded by a first outer row of cells with each cell in the outer row having a first binary value (e.g., black) and a second row of cells between the outer row and the grid with each cell in the second row having a second binary value (e.g., white) opposite the first value.

In another embodiment a computer-implemented method of determining parameter values of a camera is disclosed. The method includes receiving an image obtained from the camera of a 3-dimensional (3D) physical scene that includes a calibration target comprising a plurality of unique fiducial markings; locating at least one set of 2-dimensional (2D) image coordinates within the image corresponding to a fiducial marking; comparing the 2D image of the fiducial marking to a computer model of the calibration target to uniquely identifying which of the multiple fiducial markings corresponds to the located set of 2D image coordinates; for at least one uniquely identified fiducial marking, estimating corresponding 3D coordinates of at least one part of the fiducial marking in the 3D scene; and applying an error minimization operation to determine a set of parameter values of the camera using the at least one estimated 3D location.

In still another embodiment, a computer-implemented method of placing a virtual camera in a computer generated model of a scene is disclosed. The method includes capturing an image of a calibration target in the physical scene with a physical camera, the calibration target having a plurality of unique patterns on its surfaces and windows that enable the unique patterns on rear surfaces to be viewed at certain camera angles; comparing, with a processor, the captured image to a computer graphics model of the calibration target stored in a computer-readable memory operatively coupled to the processor; mapping, with the processor, visible unique fiducial markers in the captured image to the computer graphics model; determining, with the processor, the position, rotation, and focal length for the physical camera; and setting a virtual camera in a computer graphics environment based on the determined position, rotation, and focal length of the physical camera.

To better understand the nature and advantages of these and other embodiments of the present invention, reference should be made to the following description and the accompanying figures. It is to be understood, however, that each of the figures is provided for the purpose of illustration only and is not intended as a definition of the limits of the scope of the present invention. It is to be further understood that, while numerous specific details are set forth in the description below in order to provide a thorough understanding of the invention, a person of skill in the art will recognize that the invention may be practiced without some or all of these specific details.

BRIEF DESCRIPTION OF THE DRAWINGS

FIG. 4 is a top plan view of a third planar component of the calibration target shown in FIG. 1.

FIG. 5 is a top plan view of a fourth planar component of the calibration target shown in FIG. 1.

FIGS. 7A-7C are simplified illustrations of fiducial markings that can be incorporated onto a calibration target according to embodiments of the invention.

DETAILED DESCRIPTION OF THE INVENTION

Embodiments of the invention are directed to devices, methods and systems for calibrating a camera. Calibration of a camera entails, in part, determining parameters of a camera related to its focal length, principal point, and other values that affect how the camera produces a two-dimensional (2D) image from a view of points in a three-dimensional (3D) space. Once known, the parameters of the camera may be used in forming or adjusting the images that the camera produces.

Other embodiments of the invention are directed to devices, and methods and systems for their use, for determining properties of virtual cameras based on one or more images of at least one physical scene. While the images may be captured using a calibrated physical camera, it may be useful or necessary to be able to determine imaging properties of the camera from just the captured images. Such imaging properties may be used to implement a virtual camera in a computing system to create computer-generated images. Non-limiting examples of such imaging properties include field of view, focal length, depth of field and distance from objects in a scene.

Often, calibrating a camera involves producing one or more images or pictures of a test object with the camera, locating components of the image that correspond to particular parts of the test object, and calculating the camera parameters based on the image components, the geometry of the test object, its position relative to the camera when the image was taken, and the physical assumptions about the camera. The test object is sometimes referred to as a calibration target or a calibration tool. In some instances, particular parts of the calibration target are marks on the surface known as fiducial markings or fiducials.

Figure 1:
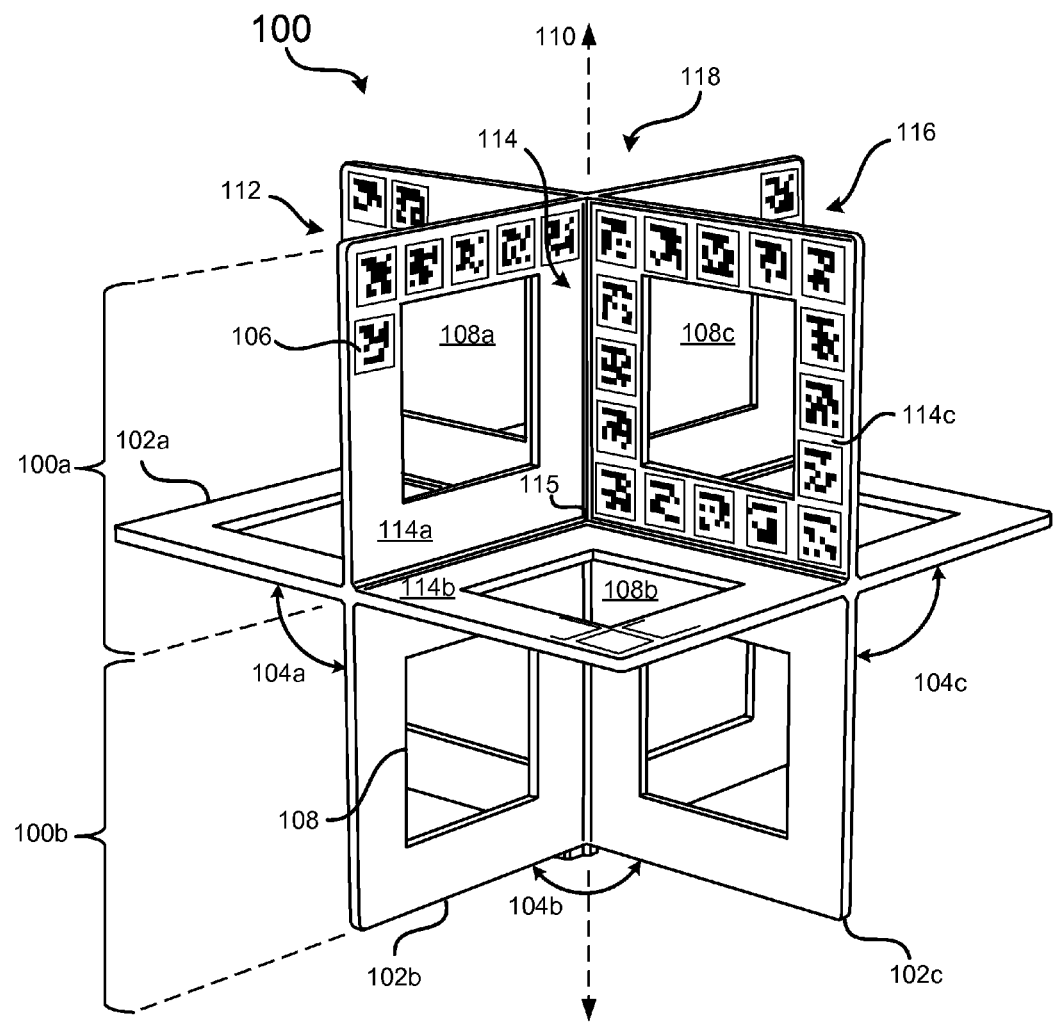
FIG. 1 is a simplified perspective view of a calibration target according to an embodiment of the invention that can be used to automatically calibrate a camera.

FIG. 1 shows a calibration target 100 according to an embodiment of the invention that can be used to calibrate one or more cameras. Calibration target 100 includes three rectangular planar plates 102a, 102b and 102c, that intersect at a common point forming a structure having eight separate open-faced trihedral sections arranged around a central axis 110. Four of the trihedral sections 112, 114, 116 and 118 are located in a top half 100a of the target 100, and four of the trihedral sections (not labeled) are located in a bottom half 100b of target 100.

Each of the eight open-faced trihedral sections includes first, second and third faces that intersect at a corner. For example, as shown in FIG. 1, trihedral section 114 includes faces 114a, 114b and 114c that intersect at trihedral corner 115. Faces 114a, 114b and 114c all have a square shape in the embodiment shown in FIG. 1. The invention is not limited to any particular shape for these and other faces of the trihedral sections, however, and the faces can have a triangular shape, a rectangular shape where the length and width of the rectangle are not equal to each other, or shapes where one or more outer surfaces of the face that are not joined to other sections are curved.

A plurality of fiducial markers 106 are provided on each face of each trihedral section to provide patterns for recognition by a camera system as explained below. For ease of illustration, only some of fiducial markers 106 are shown in FIG. 1. In the embodiment shown, each fiducial marking 106 is square in shape and located on an outer band of each face. In additional and/or alternative embodiments, the fiducial markings may have other geometric shapes, and/or be located at different locations on the faces.

Each face of each trihedral section in calibration target 100 also includes a window 108 that enables one or more fiducial markings on a face behind the window to be visible to a particular camera view through the window for calibration purposes when the fiducial markings would otherwise be blocked to the camera by one of the surfaces of target 100. This may be advantageous in calibrating the camera initially and then for orienting the camera and determining imaging parameters for the camera to be applied to a virtual camera.

For each individual face, the fiducial markings may be arranged around the window 108 formed in that face. Thus, for example, surface 114a may include a window 108a and a first set of fiducial markings, surface 114b may include a window 108b and a second set of fiducial markings, and surface 114c may include a window 108c and a third set of fiducial markings FIG. 1 shows fiducial markers 106 positioned on surface 114c along all four sides of window 108c. As previously discussed many fiducial markings were left out of FIG. 1 for ease of illustration, but it is understood that fiducial markers similar to those shown around window 108c may also be provided around each of the other windows of calibration target 100 including windows 108a and 108b.

Each window 108 may be either a tranparent material, such as cellophane, acrylic or glass or may be an area void of material. The particular embodiment of calibration target 100 shown in FIG. 1 includes windows that are square in shape and void of material. Each window is centrally located on its respective surface, and each surface has a border area surrounding the respective window on which the fiducial markers 106 can be located. In other embodiments, windows 108 may have different shapes, may include more than one window per surface or have no windows at all.

The planar plates of calibration target 100 may be composed of a material having sufficient rigidity to enable the device to maintain its shape and stand without exterior support. In some embodiments, target 100 may have a handle (not shown) that extends out of a bottom surface to enable the target to be held by a person while being captured by a camera in a scene. In one embodiment, calibration tool 100 is approximately the same size of a life-size bust of a human head. This can be useful for calibrating cameras, or determining their imaging parameters, in order to obtain accurate images of a human actor, in which inaccuracies would be quickly apparent to a human viewer. In alterative embodiments, calibration targets according to the present invention may have other sizes.

As shown in FIG. 1, planar plates 102a, 102b and 102c may be configured to intersect mutually perpendicularly; that is, the angles of intersection of each pair of planar plates, shown in FIG. 1 by angles 104a, 104b and 104c, may be right angles. In the embodiment shown in FIG. 1, each of the planar plates 102a, 102b and 102c is square in shape and includes four square sections, arranged as a two-by-two grid. Each pair of the planar plates 102a, 102b and 102c intersect along a midline of the square shape, bisecting each planar surface.

Figure 6:
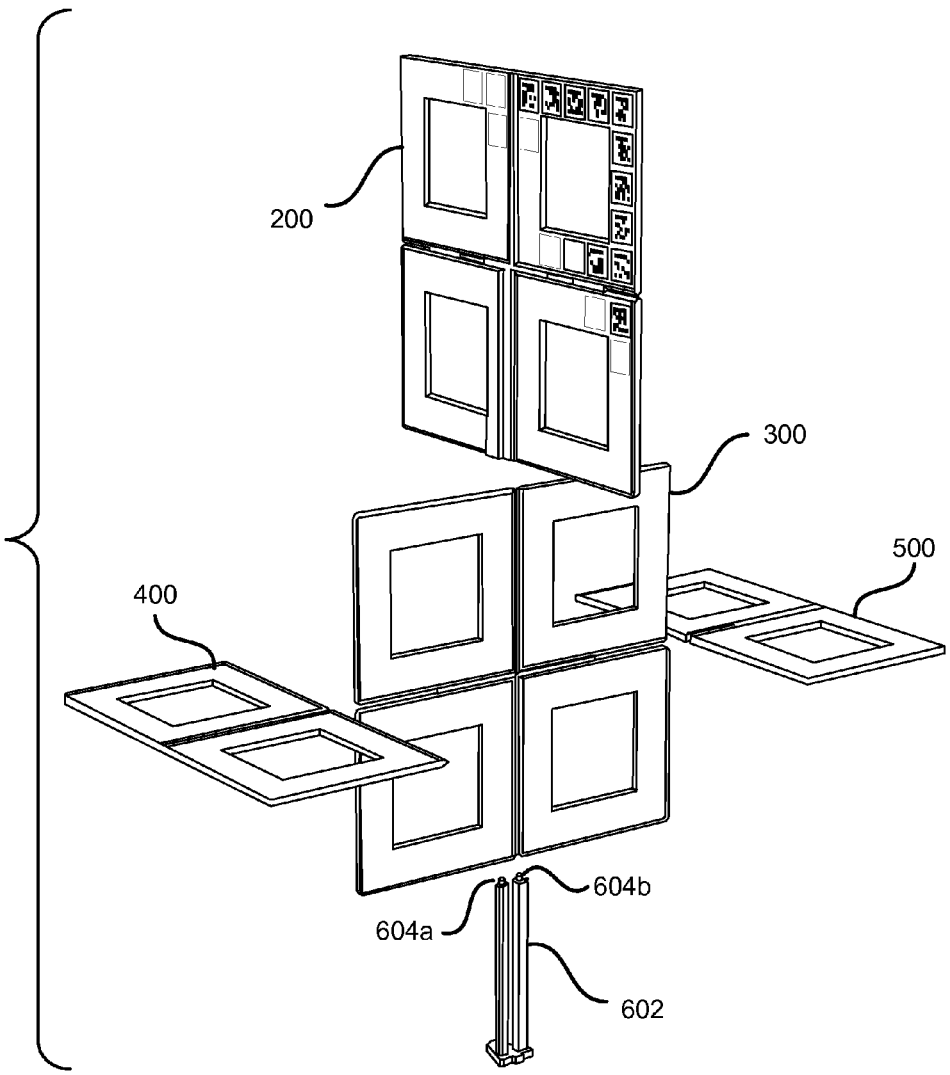
FIG. 6 is a simplified perspective view showing the separated first, second, third and fourth planar components shown in FIGS. 2-5 oriented for assembly to form calibration target 100 shown in FIG. 1.

In some embodiments, calibration target 100 is made from multiple parts that can be easily assembled and disassebled to facilitate transportation of target 100 from one scene (or movie set) to another. Such an assembly method may also make for efficient application of the fiducial markings on the planar surfaces prior to assembly. As an example, reference is made to FIGS. 2-5, which show simplified plan views of various components that can be assembled together to form calibration target 100 according to one embodiment of the invention, along with FIG. 6, which is a simplified exploded perspective view showing the components depicted in FIGS. 2-5 oriented for assembly to form calibration target 100. As shown in FIG. 6, component 200 (also shown in FIG. 2) corresponds generally to planar plate 102c in FIG. 1, while component 300 (also shown in FIG. 3) corresponds generally to planar plate 102b, and components 400 and 500 (also shown in FIGS. 4 and 5, respectively) combine to correspond generally to planar plate 102a. Each of components 200, 300, 400 and 500 has a thickness that is small in comparison to its length and width and has fiducial markings located on each of the opposing two major sides of the component.

Figure 2:
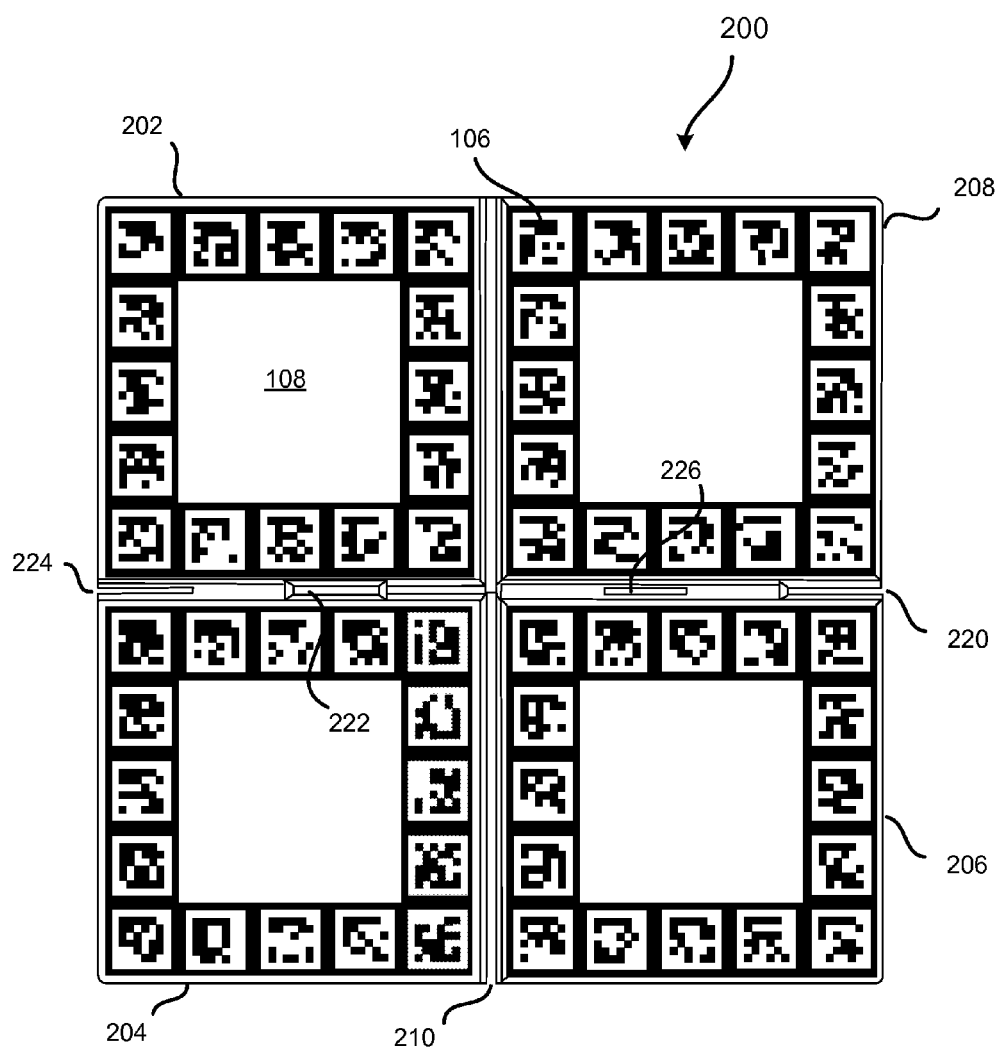
FIG. 2 is a top plan view of a first planar component of the calibration target shown in FIG. 1.
Figure 3:
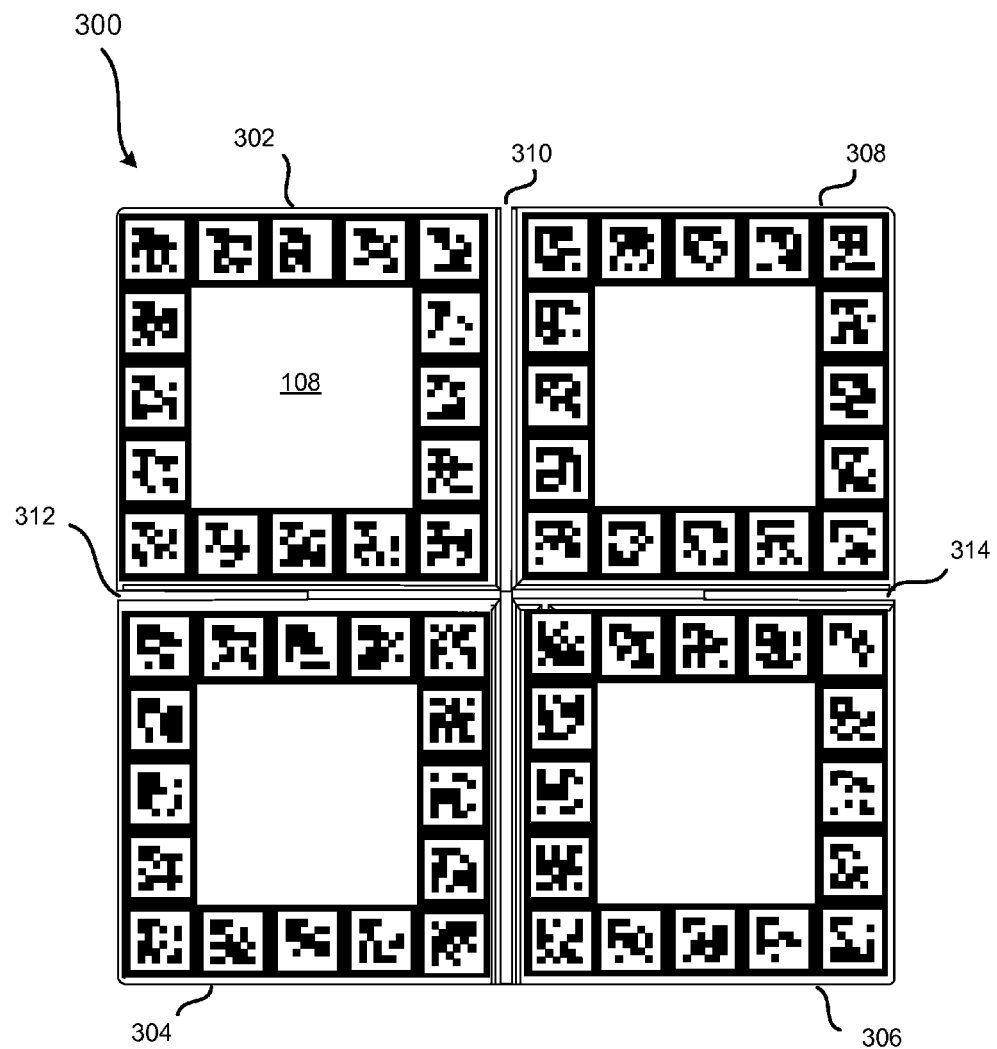
FIG. 3 is a top plan view of a second planar component of the calibration target shown in FIG. 1.

FIG. 2 shows a plan view of a first square planar component 200 that includes four separate sections 202, 204, 206 and 208 sections arranged in two-by-two grid. Each of the sections has a window 108 formed there through along with a set of unique fiducial markers 106 positioned around the perimeter of the window. Component 200 further includes a slot 210 that extends a full section length between sections 204 and 206. Similarly, FIG. 3 shows a plan view of a second square planar component 300 that includes four separate sections 302, 304, 306 and 308, each of which has a window 108 formed there through along with sets of unique fiducial markers 106 surrounding each window. Component 300 includes a slot 310 that extends a full section length between sections 302 and 308 along with a slot 312 that extends between sections 302 and 304 for half the length of a section and a slot 314 that extends between sections 306 and 308 for half the length of a section.

Component 200 can be assembled with component 300 by sliding slot 210 into slot 310 as shown in FIG. 6. Similarly, components 400 and 500, each of which as shown in FIGS. 4 and 5, respectively, has a rectangular shape, can be assembled with component 300 by sliding slot 410 of component 400 in to slot 312 and by sliding slot 510 of component 500 into slot 314. When component 400 is positioned correctly so that section 402 is aligned with and abuts sections 202 and 302, tabs 412 and 414 mate with slots 220 and 222, respectively, in component 200 providing additional rigidity to calibration target 100. Similarly, when component 500 is positioned correctly so that section 502 is aligned with and abuts sections 202 and 308, tabs 512 and 514 mate with slots 224 and 226, respectively, in component 200 providing still further rigidity to calibration target 100.

As shown in FIG. 6, after components 200, 300, 400 and 500 are joined together, the assembly of calibration target 100 can be completed by sliding pin 602 over the central portion of components 200 and 300 in the lower half 100b of target 100. Pin 602 includes two protrusions 604a, 604b that align with and slide into corresponding holes in components 400 and 500. While components 200, 300, 400 and 500 are attached in one embodiment via the use of interference fits between various slots and tabs as described above, other methods of attachment will be apparent to one of skill in the art. Similarly, it will be apparent to one of skill in the art that alternative methods of fabricating the calibration target 100 are also possible including injection molding, welding, or the like.

Reference is now made to FIG. 7A, which shows an embodiment of a single fiducial marking 106 according to an embodiment of the invention. As shown in FIG. 7A, fiducial marking 106 is square in shape and is configured to have a 10-by-10 grid of smaller squares, which can be differently colored. In one embodiment, an outer peripheral band 702 of squares are all colored black or a dark color, and a second inner band of squares 704 interior to but touching the outermost band has a light color to contrast with the black or dark outer band. In one particular embodiment band 702 is black and band 704 is white. Interior to the two bands 702 and 704 is a 6-by-6 grid 706 of smaller squares in which a unique pattern of dark (or black) colored and light colored (or white) smaller squares is created.

In some embodiments of the invention the pattern formed in the 6×6 grid of each and every fiducial marking on calibration tool 100 is unique. This enables software to identify the exact location of a particular fiducial marking visible to a camera. FIGS. 7B and 7C depict two examples of fiducial markings 106a and 106b that differ from each other in the pattern of black and white squares within grid 706 of each marker, which allows $2^{36}$ distinct patterns of black and white (binary value) subsquares within a fiducial marking with respect to an orientation of the square. However, to allow for rotational equivalences of the square, dividing this by 4 produces a lower bound on the number of rotationally distinct markings. In the embodiment of the apparatus as shown in FIG. 1, with planar surfaces such as 200, 300, 400 or 500, there are up to 16 fiducial marks on each of quadrant of a side of the surface. So on such a planar surface, allowing for both sides, there would be 16×4× 2=2$^7$=128 fiducial markings needed. For three planar surfaces as in FIG. 1, there would thus be at most 384 fiducial markings needed to ensure that each fiducial marker on the calibration target 100 is unique. Thus, even allowing for rotationally equivalent fiducial markings, there are significantly more than enough possible fiducial markings to be able to use all distinct fiducial markings on the apparatus. Further, various selection processes may be used to choose a set of fiducial markings for the apparatus such that the fiducial markings in the set are not only distinct, and also that any two differ in a large number of the smaller subsquares.

In other embodiments, the fiducial markings may have a rectangular, triangular, circular or other shapes, and/or may include a pattern made up of components other than a grid of similarly sized squares. For example, in some embodiments the fiducial markings may include a plurality of hexagons, pentagons, rectangles, triangles, dots or other shapes within an outer border of the fiducial.

Additional and/or alternative embodiments may include any of the following features. The fiducial markings may contain information within the pattern of black and white subsquares. The particular sequence of fiducial markings around the border area of a quadrant of a planar surface may also contain information to assist in identification of the fiducial markings, and/or to assist in the calibration of the camera. Particular fiducials which are known to be easily recognized in a camera may be positioned at particular locations on the apparatus to aid in identifying which surface is being viewed.

Calibration target 100 and its equivalents may be used either to calibrate a camera, and/or to determine imaging properties of a camera, from images taken by the camera. Methods according to the invention use the information available via a captured image of calibration target 100 to increase automation of calibration and other operations. The size of the of the apparatus, including the boundary area surrounding a window, and the size of the fiducial markings and their location on the apparatus may be recorded or known before the calibration target is used.

Figure 8:
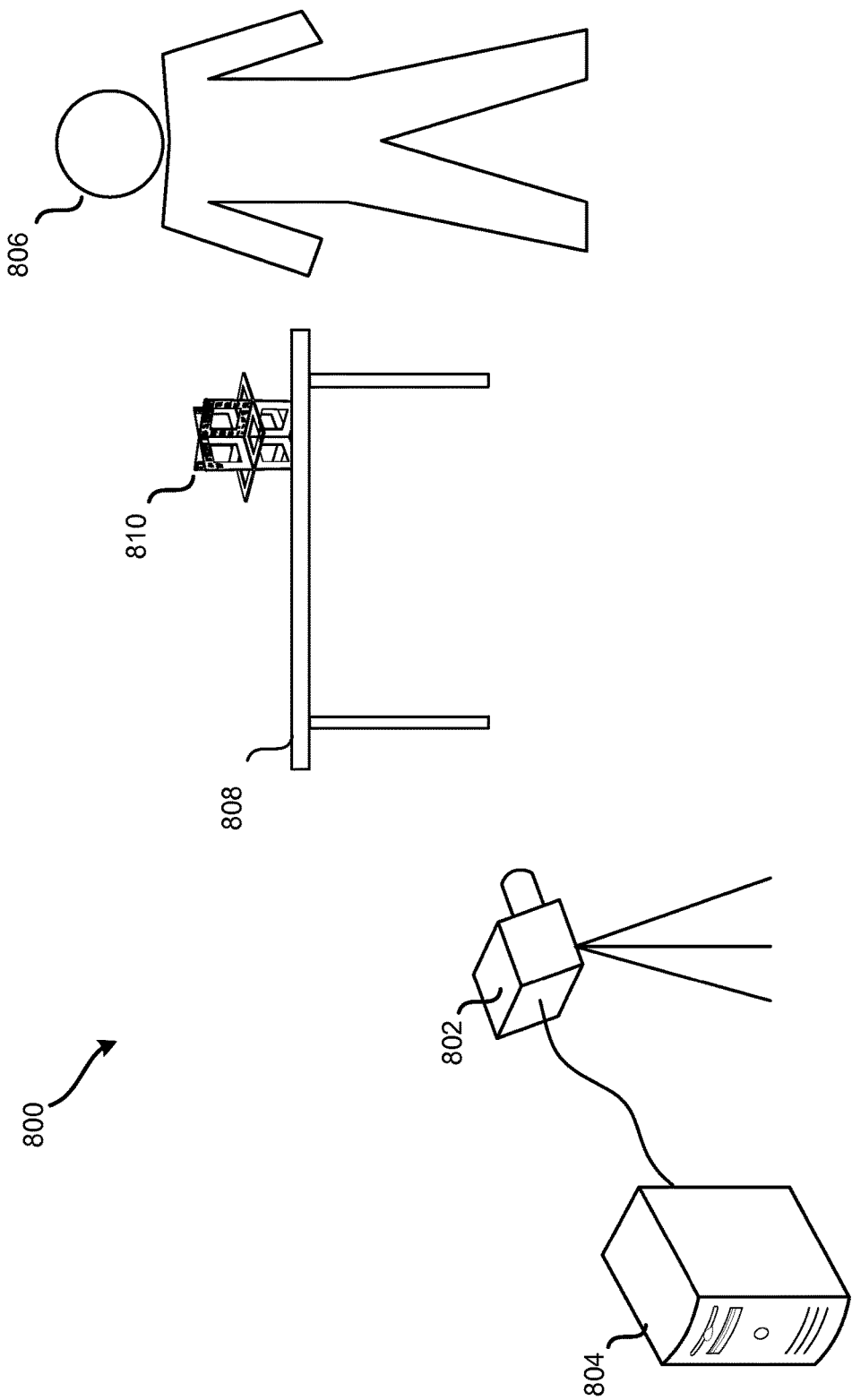
FIG. 8 is a simplified view of the calibration target located in a three dimensional space being imaged by a camera.

FIG. 8 is a simplified schematic diagram showing a system 800 for calibrating a camera according to one embodiment of the invention. As shown in FIG. 8, system 800 includes a physical camera 802 that can be, for example, a digital camera, a movie camera, or a video camera, and a processor 804, such as the computer processing system described in FIG. 10. Camera 802 is directed to take images of a physical scene that may include one or more actors 806 and/or props 808. A calibration target 810 is positioned in the scene so that it is within the field of view of camera 802. During operation, camera 802 captures images of the scene including images of calibration target 810, which may include unique patterns and/or codes along one or more of its surfaces along with windows that enable identification of the unique patterns/codes on surfaces that would otherwise not be visible to camera 802 for enhanced accuracy.

The captured images are sent to processor 804, which stores a computer graphics model of calibration target 810 including the positions and unique patterns of the fiducial markings on the target. Calibration target 810 includes unique fiducial markings and windows, such that, for any given image there is only one position, rotation, distortion value, and focal length for the camera of interest. Thus, without receiving input from a user, processor 804 can compare information from the captured images to the computer graphics model to idenfify fiducial markings on calibration target 810, and based on the comparison, determine, among other parameters, the position, rotation, distortion and focal length of the camera with respect to the calibration target 810 and scene as described below with respect to FIG. 9A. Processor 804 can also be used to place a virtual camera in a computer generated 3D scene including setting the virtual camera's position, rotation, distortion and focal length according to the intrinsic and imaging parameters of camera 802 as described with respect to FIG. 9B.

Figure 9A:
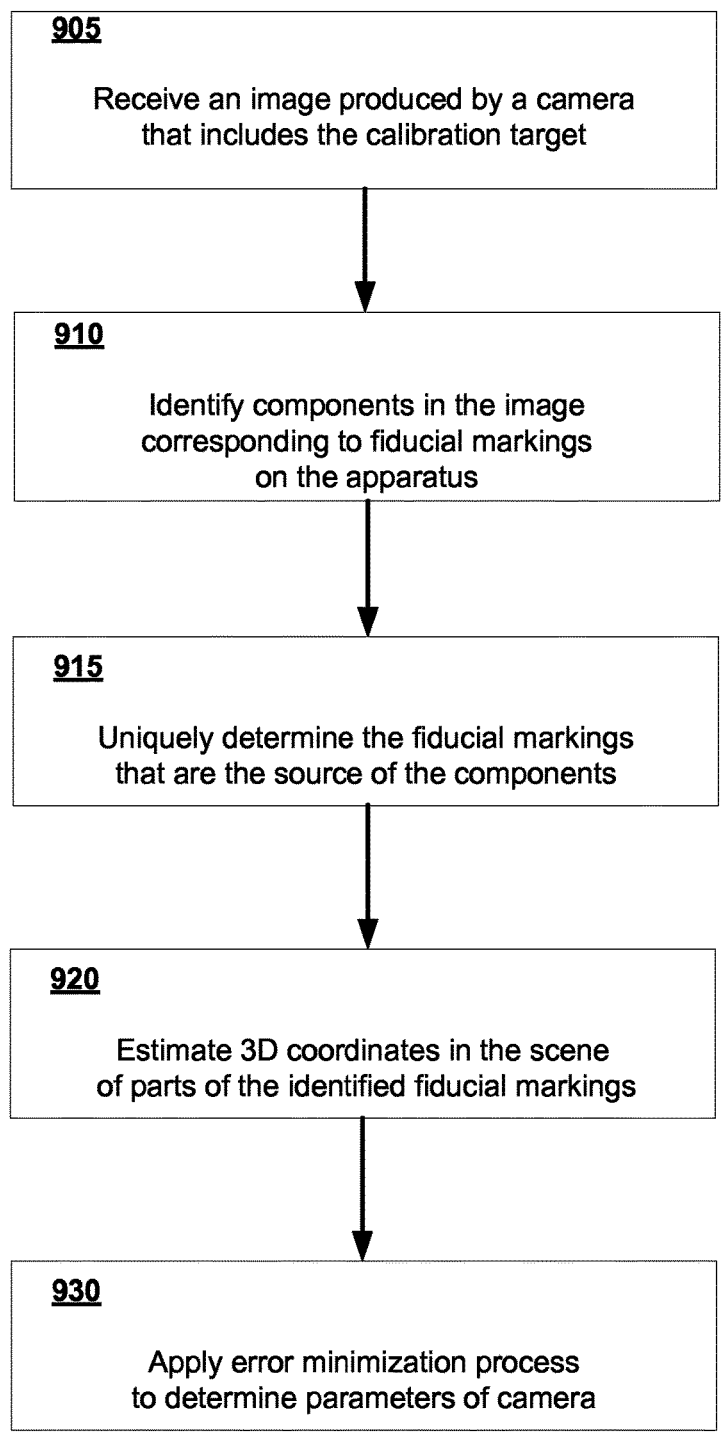
FIG. 9A is a flowchart of a method for calibrating a camera according to an embodiment of the invention.

FIG. 9A shows a flow chart for a method 900 for calibrating a camera using the calibration target 100 of FIG. 1, or an alternate embodiment thereof. The calibration target 100 may be placed in a physical set depicting a scene. Information regarding the location of the calibration target 100 in the scene, such as which surface of the apparatus is facing the camera, the distance from the camera to a particular point on the apparatus, or other data, may be recorded to assist in the camera calibration. Once the calibration target 100 is positioned in the scene, the camera is directed so as to include the calibration target 100 in an image, and at least one image that includes the calibration target 100 is obtained using the camera. In some embodiments the images are digitally generated, such as by a camera using a charge-coupled device (CCD). In other embodiments the images may be captured on film, and then scanned into digital form. In digital form the pixel coordinates of an image point can be determined. The image is then received at a computational device or system capable of analyzing images and image data (step 905).

Each image captured for calibrating a camera may include a 2D array of pixels, and may be enumerated using pixel coordinates. Pixel coordinates may be normalized or converted to homogeneous coordinate form. An identification procedure is performed on an image in order to identify parts of the image that correspond to particular fiducial markings (step 910). That is, the parts or segments of the image are identified for which a fiducial marking on the calibration target was the source in the physical scene. Such a procedure may involve one or more pattern recognition algorithms. When the embodiment of FIG. 1 is used, the fact that the fiducial markings are square and unique may be used as part of the pattern recognition algorithm. Also, in the case that the fiducial markings are as disclosed in relation to FIG. 7A, the pattern recognition algorithm may use the known information about the bands to assist in identifying the image of fiducial markings within the captured image.

The pattern recognition algorithm may determine a plurality of parts of the image corresponding to fiducial markings, but with varying levels of certainty that a fiducial marking is the source. The identification procedure may choose a sufficient number of the image parts having sufficient certainty of corresponding to fiducial marking. In one embodiment, only fiducial markings that are fully visible in an image are chosen for analysis by the pattern recognition algorithm. Thus, for example, a fidicual marking that is only partically visible through a window 108, may be excluded form the pattern recognition algorithm in order to increase the effectiveness of the algorithm.

Once a part of image has been identified as the image of a fiducial marking on the calibration target, in the case that each fiducial marking of the calibration target is unique, pattern matching algorithms or pattern recognition operations that compare the image to a computer model of the calibration target inlucing its fiducial markings may be used to uniquely determine which of the fiducial markings was the source for that part of the image (step 915). Nonlimiting examples of such pattern matching algorithms include the discrete Fourier tranform, the Hough transform and wavelet transforms. In some embodiments of the calibration target 100, the fiducial markings may be chosen to have easily recognized and distinguished transforms. Known relative locations of the fiducial markings on the calibration target may be used as part of the pattern recognition operations.

Once a part of the image has been identifed as a fiducial marking, and the identification of the particular fiducial marking has been determined, one or more specific features of the fiducial marking may be located in the image. In embodiments that use the calibration target of FIG. 1 with fiducial markings as in FIG. 7, the specific features may be one or more of the corners of the fiducial marking.

In some embodiments of the method, subimages of multiple fiducial markings are identified within the image, the corresponding unique fiducial markings are determined, and specific features of each fiducial marking are selected. As an illustrative example, for the calibration target 100 shown in FIG. 1 with fiducial markings as shown FIG. 7 and described above, multiple components of the image corresponding to fiducial markings may be identified, the respective source fiducial marking uniquely determined, and the corners of those fiducial markings selected as source points. A set of 2D image coordinates, such as either pixel coordinates or homogeneous coordinates, of the source points is then obtained.

Using the set of 2D image coordinates of the source points, reprojection of the set 2D image coordinates of the source points is performed to determine a corresponding set of estimated 3D coordinates for the location in the 3D scene of the source points of the selected features (step 920). The known sizes and orientations of the fiducial markings, both relative to each other, and relative the calibration target 100 as a whole, may be used to determine an estimated configuration of the calibration target 100 in the 3D scene. Other information may also be used, such as the overall outline and dimension of the calibration target 100, and information independently determined regarding the image, for example a known distance between the calibration target 100 and the camera when the image was generated.

Using the set of estimated 3D coordinates and the estimated configuration of the calibration target 100, an error minimization operation is performed to determine an estimate for the intrinsic parameters of the camera (step 925). In one embodiment, a known relationship connecting world coordinates of a point in the 3D scene and corresponding point in the 2D pixel coordinate space is:

$$z_c[u,v,1]^T = A[RT][x_w,y_w,z_w,1]^T \quad [1]$$

In this equation, $[u,v,1]^T$ denotes the pixel coordinates on the image plane of an image point using homogeneous coordinates, $[x_w,y_w,z_w,1]^T$ are the 3D world coordinates of the original source point in homogeneous coordinates, R and T represent extrinsic parameters which transform a point's 3D world coordinates to the camera's 3D coordinates, with R being a rotation matrix. The parameter $z_c$ is a constant of proportionality. The matrix A comprises the intrinsic parameters of the camera. It is given by:

$$A = \begin{pmatrix} a_x & \gamma & u_0 \\ 0 & a_y & v_0 \\ 0 & 0 & 1 \end{pmatrix}.$$

Here, $a_x$ and $a_y$ are related to the camera's focal length and scale factors that relate distance to pixels. The intrinsic parameter $\gamma$ is a skew coefficient. The values $u_0$ and $v_0$ represent the principal point.

Nonlimiting examples of error minimization operations include gradient descent, the Levenberg-Marquardt algorithm, and the Gauss-Newton algorithm. The error minimization operation may use the known relative positions of the uniquely determined fiducial markings as criteria for error minimization. In additional and/or alternative embodiments, the method 800 may be iterated using the an initial estimate of the intrinsic parameters to improve the reprojection estimates and the estimation of the intrinsic parameters. In additional and/or alternative embodiments, the method 900 may be applied to multiple images to obtain improve estimates.

The exemplary steps shown in method 900 are capable of being performed within a computing system without a user once a digital image is obtained by the system. A user is not needed to view the image on a display and enter identication of particular 2D coordinates and corresponding 3D locations. In various embodiments the uniqueness of the fiducial markings and the pattern recognition algorithms, together with error minimization algorithms, allow a computing system to proceed without needing user input. However, it will apparent to one of skill in the art that the method 800 may be implemented in conjunction with user input at any stage to improve overall performance.

The methods just described refer to only one image, but it is clear to a person of skill in the art that using a sequence of different images of the calibration target and proceeding as above to generate successive estimates for the parameters of the camera would allow better refinement of the values for the camera parameters. In some embodiments, different images may be used which show the calibration target from different orientations and/or from different distances. In one embodiment, the successive estimates for parameters of the camera may be weighted and averaged to obtain a single estimate for the camera's parameters.

Figure 9B:
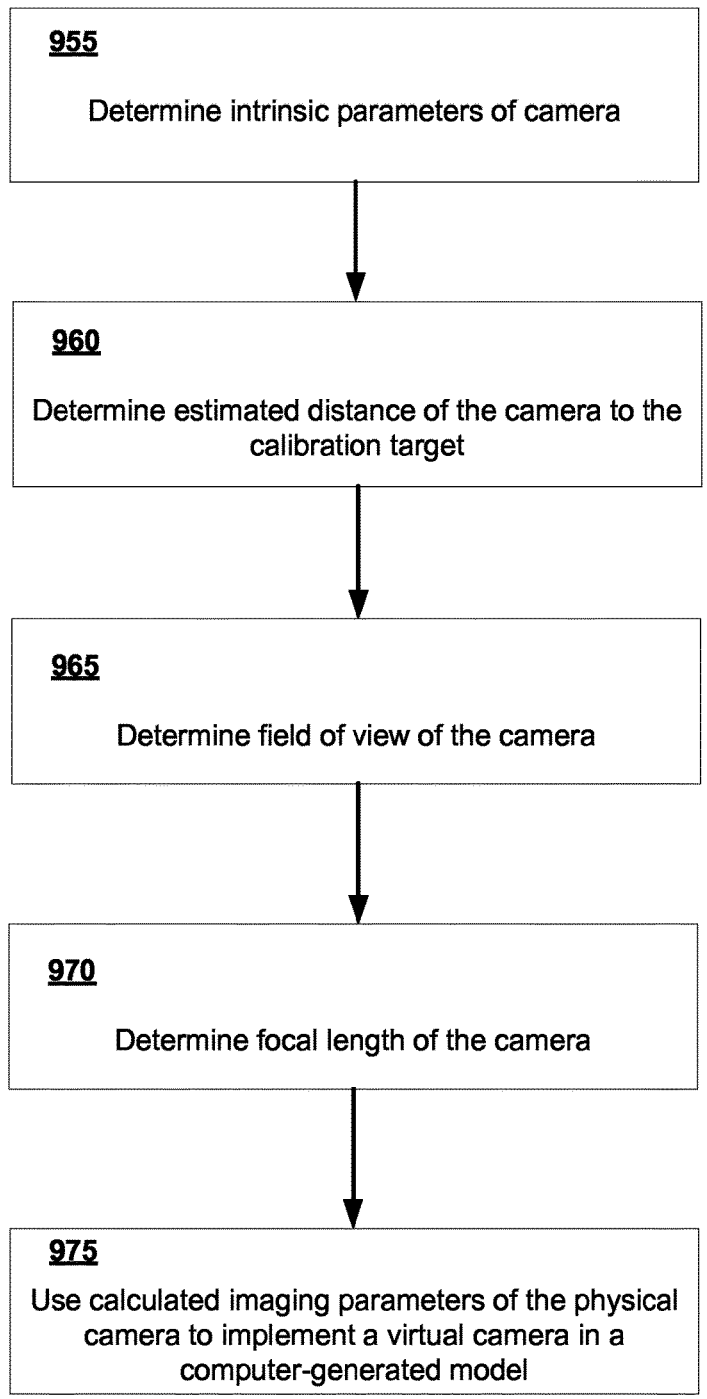
FIG. 9B is a flowchart of a method for calibrating a virtual camera according to an embodiment of the invention.

Once a camera's intrinsic parameters are known, such as by the calibration method just disclosed, a calibration target 100 may also be used to determine camera imaging parameters used in the capture of subsequent images. The imaging parameters may then be used by a virtual camera within a computing system. One embodiment according to the invention for placing a virtual camera within a computer generated graphics scsense is set forth in FIG. 9B as method 950. As shown in FIG. 9B, at least one digital image of a 3D scene containing the calibration target 100 is obtained from a camera and the camera's intrinsic parameters are determined from the at least one image (step 955). The procedure for determining the camera's intrinsic parameters includes, as described above with respect to FIG. 9A, locating, by a computing system, components of the digital image corresponding to a fiducial marking, uniquely identifying the fiducial marking from among all the fiducial markings known to be on the calibration target 100, indentifying 2D image components of parts or points of the identified fiducial markings, reprojecting the 2D parts into a representation of the 3D scene, and obtaining estimates for at least one of the position, the location, and the orientation of the calibration target 100 in the representation of the scene.

In an exemplary embodiment, method 950 further includes determining an estimated distance from the camera to the calibration target 100 (step 960). The overall dimensions of the calibration target 100, in addition to the estimated 3D locations of the source points on the identified fiducial markings, can be used in the determination. Well known operations such as triangulation based on known geometric values of the calibration target 100 and its fiducial markings may be used.

In an exemplary embodiment, the method further includes determining the field of view of the camera that produced the received 2D image (step 965). In one embodiment an estimated distance between the camera and the calibration target 100 may be obtained, as described, and used in conjunction with an observed height or width of the calibration target 100 or its fiducial markings within the 2D image to determine a vertical, horizontal and/or diagonal viewing angle of the camera.

The focal length of the camera may also be calculated (step 970). As described previously, the intrinsic parameters of the camera contain information from which the focal length may be calculated. In additional and/or alternative embodiments, the focal length may be obtained using the field of view and the relationship between the field of view and the focal length.

The imaging parameters of the camera obtained from a digital image of a 3D scene may be used to implement in a computer system a virtual camera that replicates the performance of the physical camera that obtained the original image or images (step 975). The virtual camera may be used to create animation scenes based on original physical 3D scene.

Figure 10:
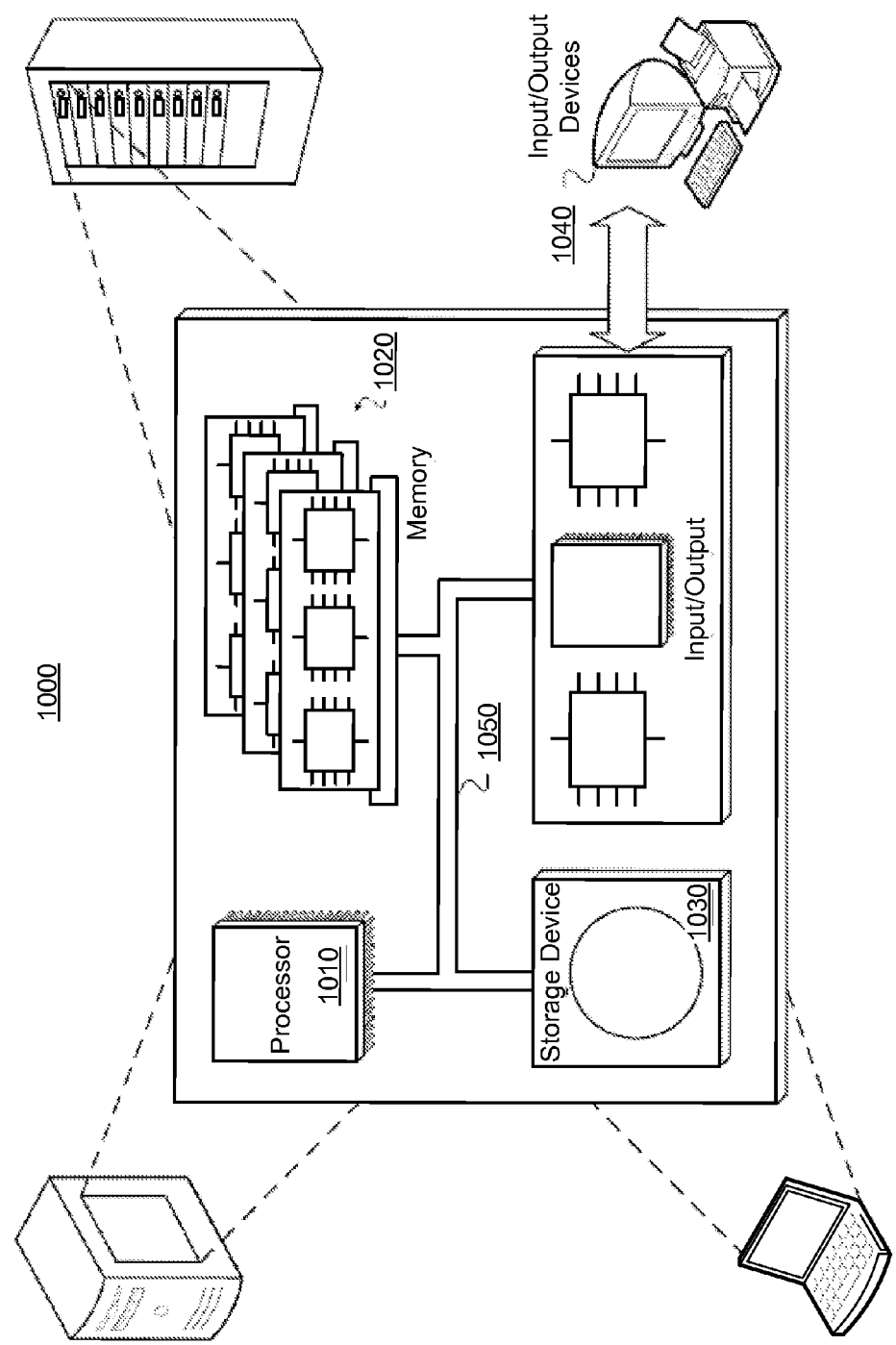
FIG. 10 is a schematic diagram of a computing system that can be used in connection with computer-implemented methods described in this document.

FIG. 10 is a schematic diagram of a generic computer system 1000. The system 1000 can be used for the operations described in association with any of the computer-implement methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 900. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. As will be understood by those skilled in the art, the present invention may be embodied in other specific forms without departing from the essential characteristics thereof. For example, while embodiments of the calibration target according to the present invention were discussed above with respect to calibration target 100 having a particular cube-like shape, the invention is not limited to any particularly shaped calibration target and calibration targets having a triangular, rectangular, or other polygonal cross-sectional shapes are possible. Those skilled in the art will recognize, or be able to ascertain using no more than routine experimentation, many equivalents to the specific embodiments of the invention described herein. Such equivalents are intended to be encompassed by the following claims.

What is claimed is:

1. A computer-implemented method of determining parameter values of a camera comprising:
   receiving an image of a 3-dimensional (3D) physical scene obtained from the camera, the image of the 3D physical scene including a calibration target comprising a plurality of unique fiducial markings;
   comparing, by the computer, the calibration target in the image to a computer model of the calibration target using at least one uniquely identified fiducial marking of the plurality of unique fiducial markings;
   for the at least one of the uniquely identified fiducial marking, estimating corresponding 3D coordinates in the 3D physical scene based on the comparison; and
   determining at least one parameter value of the camera using the estimated corresponding 3D coordinates;
   wherein the calibration target comprises a plurality of trihedral sections arranged around a central axis, each trihedral section having first, second and third surfaces with a window formed through at least one of the surfaces, each surface having at least one unique fiducial marker arranged on the surface.

2. The method of claim 1 wherein the calibration target comprises planar components arranged to project substantially into three dimensions.

3. The method of claim 1 wherein each window has a plurality of unique fiducial markers arranged around a perimeter of the window.

4. The method of claim 1 wherein estimating corresponding 3D coordinates of the at least one uniquely identified fiducial marking uses known positional relationships of the plurality of unique fiducial markings on the calibration target.

5. The method of claim 4 further comprising using an error minimizing algorithm to estimate corresponding 3D coordinates of each of a plurality of uniquely identified fiducial markings.

6. The method of claim 1 wherein the determined parameter value of the camera is an intrinsic parameter value.

7. The method of claim 1 wherein the parameter values of the camera comprise at least one of focal length, field of view and distance from the calibration target.

8. The method of claim 1 wherein the at least one uniquely identified fiducial marking is rectangular in shape and wherein the estimated corresponding 3D coordinates comprise the 3D coordinates in the physical scene of at least one corner of the uniquely identified fiducial marking.

9. A system for calibrating a camera comprising:
   one or more processors;
   memory communicatively linked with the one or more processors and comprising computer-readable instructions that when executed cause the one or more processors to implement a method comprising:
   receiving an image of a 3-dimensional (3D) physical scene obtained from the camera, the image of the 3D physical scene including a calibration target comprising planar components arranged to project substantially into three dimensions and a plurality of unique fiducial markings on the planar components;
   comparing, by the one or more processors, the calibration target in the image to a computer model of the calibration target using at least one uniquely identified fiducial marking of the plurality of unique fiducial markings;
   for the at least one of the uniquely identified fiducial marking, estimating corresponding 3D coordinates in the 3D physical scene based on the comparison; and
   determining a set of parameter values of the camera using the estimated corresponding 3D coordinates;
   wherein the calibration target comprises a plurality of trihedral sections arranged around a central axis, each trihedral section having first, second and third surfaces with a window formed through at least one of the surfaces, each surface having at least one unique fiducial marker arranged on the surface.

10. The system of claim 9 wherein the method further comprises estimating corresponding 3D coordinates of the at least one uniquely identified fiducial marking by using known positional relationships of the plurality of unique fiducial markings on the calibration target.

11. The system of claim 10 wherein the method further comprises using an error minimizing algorithm to estimate corresponding 3D coordinates of each of a plurality of the uniquely identified fiducial markings.

12. A method of placing a virtual camera in a computer graphics scene, the method comprising:
    capturing an image of a calibration target in a physical scene with a physical camera, the calibration target comprising planar surfaces configured to project substantially into three dimensions (3D) forming a plurality of trihedral sections arranged around a central axis, each trihedral section having first, second and third surfaces with a window formed through at least one of the surfaces, each surface having at least one unique fiducial marker arranged on the surface;
    comparing, with a processor, the captured image to a computer graphics model of the calibration target stored in a computer-readable memory operatively coupled to the processor;
    mapping, with the processor, at least one visible unique fiducial marker in the captured image to the computer graphics model;
    determining, with the processor, at least one parameter for the physical camera in relation to the calibration target; and
    setting a virtual camera in a computer graphics environment based on the determined parameter of the physical camera.

13. The method of claim 12 wherein the at least one parameter of the physical camera may be one of position, rotation, and focal length.

14. The method of claim 12 wherein determining the at least one parameter of the physical camera includes estimating corresponding 3D coordinates in the physical scene of the at least one visible unique fiducial marking.

15. The method of claim 14 wherein estimating corresponding 3D coordinates of the one visible unique fiducial marking uses known positional relationships of the plurality of unique fiducial markings on the calibration target.

16. The method of claim 15 further comprising using an error minimizing algorithm to estimate corresponding 3D coordinates of each of a plurality of visible unique fiducial markings.

17. A system for placing a virtual camera in a computer graphics scene, comprising:
- one or more processors;
- memory communicatively linked with the one or more processors and comprising computer-readable instructions that when executed cause the one or more processors to implement a method comprising:
- capturing an image of a calibration target in a physical scene with a physical camera, the calibration target comprising planar surfaces configured to project substantially into three dimensions (3D) forming a plurality of trihedral sections arranged around a central axis, each trihedral section having first, second and third surfaces with a window formed through at least one of the surfaces, each surface having at least one unique fiducial marker arranged on the surface;
- comparing, with a processor, the captured image to a computer graphics model of the calibration target stored in a computer-readable memory operatively coupled to the processor;
- mapping, with the processor, at least one visible unique fiducial marker in the captured image to the computer graphics model;
- determining, with the processor, at least one parameter for the physical camera in relation to the calibration target; and
- setting a virtual camera in a computer graphics environment based on the determined parameter of the physical camera.

18. The system of claim 17 wherein the at least one physical parameter may be one of position, rotation, and focal length.

19. A computer-implemented method of determining parameter values of a camera comprising:
- receiving an image of a 3-dimensional (3D) physical scene obtained from the camera, the image of the 3D physical scene including a calibration target comprising a plurality of unique fiducial markings and windows such that for any given image of the calibration target taken by a camera there is only one position, rotation, distortion value and focal length for the camera;
- performing, with the computer, an identification process on the image to identify a plurality of different parts of the image that are likely to correspond to fiducial markings of the calibration target;
- comparing, by the computer, each individual part of the image in the plurality of different parts of the image identified as likely corresponding to a fiducial marking to a computer model of the calibration target to identify a unique fiducial marking that is the source for the individual part of the image;
- for at least one identified unique fiducial marking, estimating corresponding 3D coordinates in the 3D physical scene based on the comparison; and
- determining a position, rotation, distortion and focal length of the camera using the estimated corresponding 3D coordinates.

* * * * *